United States Patent [19]
Rider

[11] Patent Number: 6,020,834
[45] Date of Patent: Feb. 1, 2000

[54] SYSTEM AND METHOD FOR TRANSMITTING CODED DATA SIGNALS OVER A BANDLIMITED BUS

[75] Inventor: Scott M. Rider, Beaverton, Oreg.

[73] Assignee: Intel Corporation, Santa Clara, Calif.

[21] Appl. No.: 08/947,270

[22] Filed: Oct. 8, 1997

[51] Int. Cl.[7] .................................................. H04Q 1/39
[52] U.S. Cl. ................................................................ 341/53
[58] Field of Search .............................. 341/50, 53, 157

[56] References Cited

U.S. PATENT DOCUMENTS

| | | | |
|---|---|---|---|
| 3,810,151 | 5/1974 | Johnston et al. | 341/157 |
| 5,588,023 | 12/1996 | Ho | 375/238 |
| 5,640,160 | 6/1997 | Miwa | 341/53 |

*Primary Examiner*—Michael Tokar
*Assistant Examiner*—Anh Tran
*Attorney, Agent, or Firm*—Howard A. Skaist

[57] ABSTRACT

Briefly, in accordance with one embodiment of the invention, a method of transmitting coded data signals over a bus having a limited bandwidth includes: transmitting a first edge of a data pulse and transmitting a second edge of the data pulse. The time period between the transmitted first edge and the transmitted second edge approximates one of a set of different predetermined time periods. Selected different predetermined time periods of the set of different predetermined time periods respectively correspond to unique pluralities of binary digital signals.

Briefly, in accordance with another embodiment of the invention, a system comprises a first device, a second device and a bandlimited bus coupling the first device with the second device. At least one of the devices includes the capability to code data signals for transfer over the bus and at least the other device includes the capability to decode the data signals. The data signals are coded so that selected different durations between pairs of successive data signal edges respectively correspond to unique pluralities of binary digital signals.

Other embodiments include: a device including the capability to code data signals for transfer over a bandlimited bus; and a method, system, and device to decode data signals transmitted over a bandlimited bus.

30 Claims, 2 Drawing Sheets

CONVENTIONAL DATA SIGNAL TRANSFER TIMING

CODED DATA SIGNAL TRANSFER TIMING

SYSTEM AND METHOD FOR TRANSMITTING CODED DATA SIGNALS OVER A BANDLIMITED BUS

BACKGROUND

1. Field of the Invention

The present invention relates to transmitting data signals between devices and, more particularly, to transmitting coded data signals.

2. Background Information

In an electronic system, such as a computer, for example, data signals, such as binary digital signals or bits, are typically transferred or transmitted between devices. Data signals may be transmitted on a personal computer (PC) motherboard between peripherals or between a PC motherboard and an add-in card, for example. However, couplings between such devices, such as a bus, for example, typically have physical limitations, such as bandwidth limitations, that may affect data transfer rates. For example, the Peripheral Component Interconnect (PCI) specification, Rev. 2.1S, August, 1996, available from PCI Special Interest Group, Hillsboro, Oreg., is limited to a throughput of 132 megabytes (MB) of data signals per second. It would be desirable if the rate of data signal transfer could be increased to operate in conjunction with increases in processor speeds and peripheral performance without employing new technologies or architectures to couple devices together.

SUMMARY

Briefly, in accordance with one embodiment of the invention, a method of transmitting coded data signals over a bus having a limited bandwidth includes: transmitting a first edge of a data pulse and transmitting a second edge of the data pulse. The time period between the transmitted first edge and the transmitted second edge approximates one of a set of different predetermined time periods. Selected different predetermined time periods of the set of different predetermined time periods respectively correspond to unique pluralities of binary digital signals.

Briefly, in accordance with another embodiment of the invention, a system comprises a first device, a second device and a bandlimited bus coupling the first device with the second device. At least one of the devices includes the capability to code data signals for transfer over the bus. The data signals are coded so that selected different durations between pairs of successive data signal edges respectively correspond to unique pluralities of binary digital signals.

Other embodiments include: a device including the capability to code data signals for transfer over a bandlimited bus; and a method, system, and device to decode data signals transmitted over a bandlimited bus.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description, when read with the accompanying drawings, in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

As previously described, typically data signals, such as binary digital signals or bits, are transmitted from a first device to a second device via a bus or similar coupling. Typically, the bus or coupling employed with these devices is bandlimited. Therefore, the speed of the data signals, typically binary digital signals, that may be transferred across the bus is limited. However, improvements in technology, such as increases in processor speeds and improvements in computer peripheral performance, for systems, such as personal computer (PC) systems, for example, have made it desirable to increase the transfer rate of data signals transferred via such bandlimited buses. Of course, one approach would be to improve the technology associated with such buses and/or modify the system architecture so that higher frequency data signals may be transmitted successfully. However, it would be desirable if data signals could be transferred across such buses without such a significant modification in the underlying technology.

As one example of the typical amount of data signal transfer currently employed, the previously cited Peripheral Component Interconnect (PCI) specification, Rev. 2.1S, herein incorporated by reference, is a common specification that is employed in the personal computer industry for transferring data signals between components of a PC, such as, for example, a device on a PC motherboard (e.g., a video add-in card) to a device in a PC peripheral. Typically, a bus that transmits data signals compliant with this specification is limited to a maximum throughput of 132 MB (megabytes) per second. Of course, the invention is not limited in scope to use with a PCI specification compliant bus. For example, without limitation, a non-reflected bus may be employed.

Figure 1:
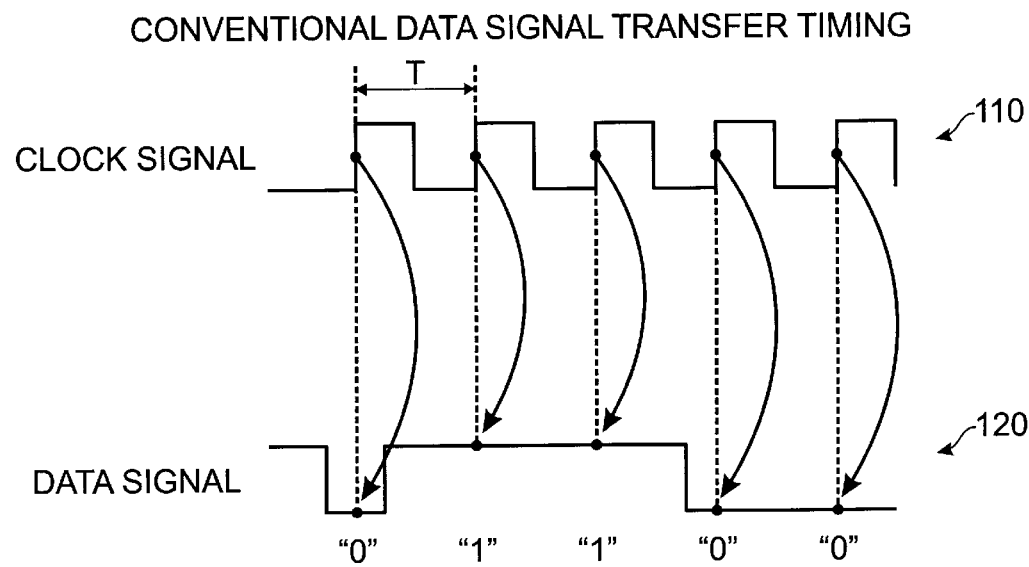
FIG. 1 is a timing diagram illustrating one embodiment of a method of transferring data signals.

FIG. 1 is a timing diagram illustrating timing for conventional data signal transmission or transfer across a bandlimited bus, such as previously discussed. Devices operating that employ such a bus and that comply with the PCI specification employ a clock signal, such as 110 illustrated in FIG. 1, to synchronize data signals, such as binary digital signals 120. Devices sample data signals, such as binary digital signals 120, upon the falling edge of a clock pulse of the clock signal, such as clock signal 110, which remains at a substantially constant frequency. A single bit transmitted per clock pulse falling edge will yield a data transfer rate of over approximately 33 million bits (Mb) per data line per second, assuming a 33 megahertz frequency. In the case of a 32-bit peripheral, for example, this provides 132 MB per second (32 Mb×32/8 bits/byte), as previously indicated. The clock signal transmitted would be a substantially constant 33 MHz. The data signal, as illustrated in FIG. 1, is modulated at a simple divided rate down to direct current (DC). Furthermore, the previous discussion does not take into account that the PCI specification employs a non-data transfer cycle for approximately every transfer of four bits or binary digital signals. This would tend to reduce the average data signal transfer rate further.

Figure 2:
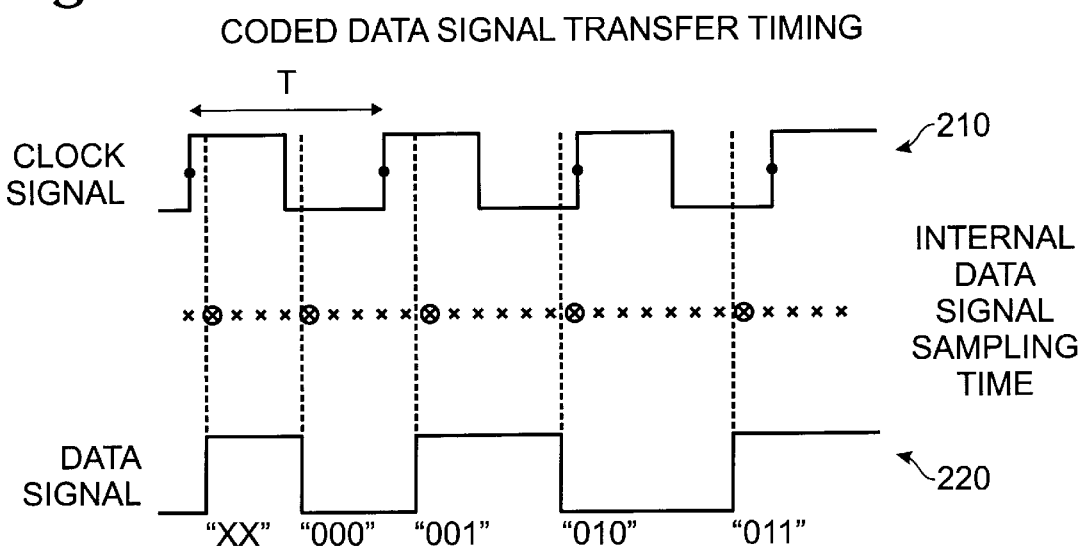
FIG. 2 is a timing diagram illustrating an embodiment of a method of transferring or transmitting coded data signals in accordance with the present invention.

FIG. 2 is a timing diagram illustrating an embodiment of a method for transferring coded data signals in accordance with the present invention. Although the invention is not limited in scope to this particular embodiment, if an embodiment in accordance with the present invention is employed, data signal transfer rates may be increased by approximately a factor of 8 without resorting to modifications to the bus or device architecture employed to transfer the data signals. Likewise, reduced radio frequency emissions (RFE) may occur.

In this particular embodiment, signal transitions of finer granularity at lower frequencies are employed to encode multiple binary digital signals per voltage transition of the data signal. An aspect of this particular embodiment is that the clock signal available to a processor or chip set, for example, may operate at a higher frequency than the frequency of the clock signal being transferred across the bus. This will be explained in greater detail below.

For this particular embodiment of a method of encoding data signals, the transmitter and receiver may include an internal or on-chip clock or access an external clock, operating at a frequency that is a multiple of the clock signal transmitted across the bus, for example. For this particular embodiment, although the invention is not limited in scope in this respect, an on-chip clock speed of 133 MHz or higher is employed. Therefore, in this example, the rising and falling edges of the data signals illustrated in FIG. 2 are sampled four times as frequently as the data signals illustrated in FIG. 1, which is possible due to a higher internal clock speed in comparison with the speed of the clock signal transferred across the bus. Therefore, when comparing FIGS. 1 and 2 for this particular embodiment, if T represents a single period or cycle for the clock signal shown in FIG. 1, then, likewise, T represents a period or cycle having that same duration in FIG. 2. However, clock signal 210 in FIG. 2 is the bus clock signal, as is clock signal 110 in FIG. 1. Therefore, in FIG. 2, the internal data signal sampling time illustrates graphically the relative speed of the internal clock operating in this particular embodiment, for example, at four times the frequency of the bus clock signal. Of course, finer frequency resolution may be employed. Furthermore, as illustrated in FIG. 2, in this particular embodiment, an assignment is made between the number of high frequency or short sampling periods or cycles in the time that has elapsed since the last or most recent voltage signal level transition and, for example, in this particular embodiment, three binary digital signals or bits. Of course, a greater number of bits may be employed. Therefore, a predetermined or preselected set of different durations are employed. Likewise, in this particular embodiment, each different time period or duration of the set is selected to correspond to a unique plurality of binary digital signals. Of course, the invention is not limited in scope to the number of durations or time periods in this particular set for this embodiment or to the number of binary digital signals represented on a voltage signal level transition for this embodiment. Likewise, the invention is not restricted in scope to a particular assignment between the unique plurality of binary digital signals and the set of predetermined durations . Therefore, as illustrated in FIG. 2, for this particular embodiment, where, for a data pulse, the last or most recently detected voltage signal level transition occurs four short sampling periods from the previously detected voltage signal level transition, the binary digital signals "000" are assigned to that data pulse. Where, for a data pulse, five short sampling periods after a previous transition, the next successive voltage signal level transition is detected, the binary digital signals "001" are assigned and so forth.

For this particular embodiment, although the clock signal transferred via the bus remains at 33 MHz, the data signal frequency is modulated from 33 MHz to DC in smaller frequency increments then previously described in connection with FIG. 1. If a greater number of bits were coded than three, a great potential frequency variation towards the low end would occur. Likewise, the data signal transfer rate increases up to eight times the single bit per clock edge data signal rate described in connection with FIG. 1. For example, because each data pulse edge transition transfers three binary digital signals and two edge transitions are employed in place of one edge transition for the approach described in connection with FIG. 1, the peak data signal transfer rate is approximately 1.056 MB per second (3×2×33 Mb/sec×32/8 bits/byte).

As illustrated in FIG. 2, the change in the voltage signal level of the data signal is sampled between "short sampling periods or cycles". In this context, "short sampling periods or cycles" refers to the period of the previously described higher frequency clock. In this particular embodiment, there are eight short cycles or periods for sampling the data signal; however, these eight short sampling cycles or periods occur after four short cycles or periods have elapsed with no sampling. Therefore, the set of predetermined time periods in this particular embodiment correspond to the fifth through twelfth short sampling cycles in succession. One reason for allowing four short cycles or periods to elapse before sampling is so that the frequency of the data signal is 33 MHz or below, in this particular embodiment.

Likewise, the actual frequency will depend, at least in part, on the data signals being transmitted. Therefore, if the data signal voltage signal level is transitioning as frequently as possible, it will transition every fourth short cycle, corresponding to all zero bits in this embodiment, which in this particular embodiment corresponds to 33 MHz. Likewise, if a data signal voltage signal level transitions as infrequently as possible, then it will transition after 12 short periods, which corresponds in this particular embodiment to all one bits and approximately an 11 MHz frequency.

Likewise, for this particular embodiment, there is a relationship between the particular data signals being transmitted and the speed of the data signal transfer. Thus, data signals are transferred more quickly or more data signals may be transferred in a particular time when, in this embodiment, all zero bits are transferred or a high proportion of zero bits are transferred. For example, if one data line out of 32 data lines transfers data signals comprising all zero bits, the data signals for that data line will be transferred before the data signals for the other data lines. Likewise, if one data line transfers data signals comprising all one bits, the increase in the data transfer rate would only be twice the data transfer rate of the approach illustrated in FIG. 1, instead of a possible eight times increase, as previously described.

Figure 3:
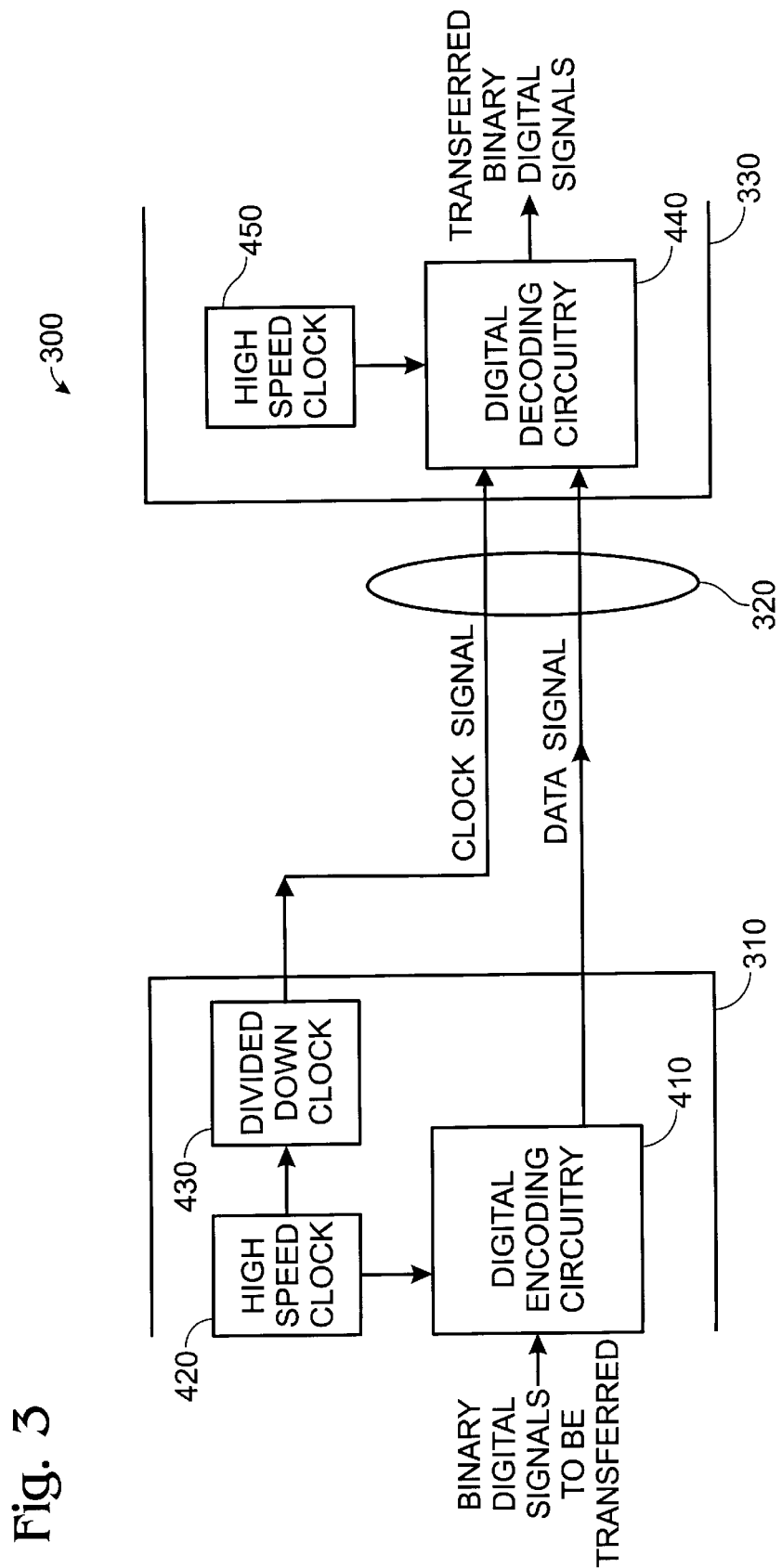
FIG. 3 is a schematic diagram illustrating an embodiment of a system of transmitting coded data signals in accordance with the present invention.

FIG. 3 is a block diagram illustrating an embodiment 300 of a system for transmitting coded data signals over a bus having a limited bandwidth. Of course, the invention is not limited in scope to this particular embodiment. In this particular embodiment 300, 310 comprises a first device, and 330 comprises a second device. For example, although not explicitly illustrated, these devices may respectively be part of a PC and a PC peripheral. Likewise, 320 comprises a bandlimited bus for transmitting clock signals and data signals, such as the signals illustrated in FIG. 2.

As illustrated in FIG. 3, binary digital signals to be transferred via bus 320 are provided to digital encoding circuitry 410. Although not illustrated FIG. 3, the binary digital signals transferred per single edge transition of a data signal in this particular embodiment are grouped as three binary digital signals. Then, depending upon the particular binary digital signals to be transmitted, a data pulse is encoded to have a duration between the first edge of the data pulse and the second edge of the data pulse corresponding to a unique plurality of binary digital signals, as previously described. As illustrated in FIG. 3, on-chip high speed clock 420, operating at 133 MHz in this particular embodiment, is employed to measure the time period between the data pulse edges of the data pulse to be transmitted via bus 320. Likewise, this high speed clock signal is divided down by clock signal divider 430 to provide the lower frequency clock signal to be transmitted via bus 320. Therefore, the coded data signal transmitted across bus 320 is synchronized with the clock signal transmitted. On the receiving side, at device 330, the clock and data signals are received by digital decoding circuitry 440. Although the invention is not limited in scope in this respect, the clock signal received may be provided to a phase-locked loop (PLL) and, therefore, high speed clock 450 may be synchronized with the clock signal received so that the data signal transmitted may be sampled, as previously described, in order to decode the binary digital signals being transferred. Although not explicitly illustrated, circuitry may be included in decoding circuitry 440 so that depending upon the number of short periods or cycles elapsed between the first and second edge transition of the data signal being decoded, the corresponding binary digital signals are produced as an output signal from decoding circuitry 440. In addition to providing a technique for synchronizing signals, the clock signal transmitted via bus 320 may also be employed to account for delays that may be attributable to aspects of the implementation, such as, may be due to a particular add-in card and an associated timing skew that may result, for example.

While certain features of the invention have been illustrated as described herein, may modifications, substitutions, changes and equivalents will now occur to those skilled in the art. It is, therefore, to be understood that the appended claims are intended to cover all such modifications and changes as fall within the true spirit of the invention.

I claim:

1. A method of transmitting coded data signals over a bus having a limited bandwidth comprising:
    transmitting a first edge of a data pulse; transmitting a second edge of the data pulse; the time period between the transmitted first edge and the transmitted second edge approximating one of a first set of different predetermined time periods; selected different predetermined time period of said set of different predetermined time periods respectively corresponding to unique pluralities of binary digital signals; wherein all the different predetermined time periods in the set of different predetermined time periods comprise a multiple of a short time period, a frequency corresponding to the short time period exceeding the bandwidth of the bus; and wherein the bus couples a personal computer and a peripheral.

2. The method of claim 1, wherein the bus comprises a bus coupling at least two devices in a personal computer system.

3. The method of claim 1, wherein all the selected different predetermined time periods in the set of different predetermined time periods exceed a time period corresponding to a frequency within the bandwidth of said bus.

4. The method of claim 1, wherein a high-speed clock having a frequency exceeding the bandwidth of the bus provides measured short time periods for the transmitted data pulse.

5. The method of claim 1, wherein the data signals comprise binary digital signals.

6. A system comprising:
    a first device; a second device; and a bandlimited bus coupling the first device with the second device; at least one of said devices including the capability to code data signals for transfer over said bus; said at least one device including the capability to code said data signals so that selected different durations between pairs of successive data signal edges respectively correspond to unique pluralities of binary digital signals; wherein said selected different durations each comprise a duration that is a multiple of a short time period, a frequency corresponding to the short time period exceeding the bandwidth of the bus; and wherein one of said devices comprises a personal computer and the other of said devices comprises a peripheral.

7. The system of claim 6,
    wherein said at least one device includes a high-speed clock to measure short time periods for the coded data signal.

8. The system of claim 7,
    wherein the bus comprises a bus coupling at least two devices in a personal computer system.

9. The system of claim 6, wherein at least the other device includes the capability to decode the data signals.

10. A device comprising:
    digital electronic circuitry; said device being adapted to be coupled to a limited bandwidth bus; said digital electronic circuitry including the capability to code data signals for transfer over said bus so that selected different durations between pairs of successive data signal edges respectively correspond to unique pluralities of binary digital signals; wherein said selected different durations each comprise a duration that is a multiple of a short time period, a frequency corresponding to the short time period exceeding the bandwidth of the bus; wherein said bandlimited bus is specifically adapted to couple a personal computer and a peripheral.

11. A method of decoding data signals transmitted over a bus having a limited bandwidth comprising:
    receiving a first edge of a data pulse; receiving a second edge of the data pulse; the time period between the received first edge and the received second edge approximating one of a set of different predetermined time periods; selected different predetermined time periods of said set of different predetermined time periods respectively corresponding to unique pluralities of binary digital signals; wherein all the different predetermined time periods in the set of different predetermined time periods comprise a multiple of a short time period, a frequency corresponding to the short time period exceeding the bandwidth of the bus; and wherein the bus couples a personal computer and a peripheral.

12. The method of claim 11, wherein the bus comprises a bus coupling at least two devices in a personal computer system.

13. The method of claim 11, wherein all the selected different predetermined time periods in the set of different predetermined time periods exceed a time period corresponding to a frequency within the bandwidth of said bus.

14. The method of claim 11, wherein a high-speed clock having a frequency exceeding the bandwidth of the bus provides measured short time periods for the received data pulse.

15. The method of claim 11, wherein the data signals comprise binary digital signals.

16. A system comprising:
a first device; a second device; and a bandlimited bus coupling the first device with the second device; at least one of said devices including the capability to decode data signals received over said bus; said at least one device including the capability to decode said data signals so that selected different durations between pairs of successively received data signal edges respectively correspond to unique pluralities of binary digital signals; wherein said selected different durations each comprise a duration that is a multiple of a short time period, a frequency corresponding to the short time period exceeding the bandwidth of the bus; and wherein one of said devices comprises a personal computer and the other of said devices comprises a peripheral.

17. The system of claim 16,
wherein said at least one device includes a high-speed clock to measure short time periods for the coded data signal;
at least some of the selected different durations being a multiple of the short time period.

18. The system of claim 17,
wherein the bus comprises a bus coupling at least two devices in a personal computer system.

19. A device comprising:
digital electronic circuitry; said device being adapted to be coupled to a limited bandwidth bus; said digital electronic circuitry including the capability to decode data signals received over said bus so that selected different durations between pairs of successive data signal edges respectively correspond to unique pluralities of binary digital signals; wherein said selected different durations each comprise a duration that is a multiple of a short time period, a frequency corresponding to the short time period exceeding the bandwidth of the bus; and wherein said bandlimited bus is specifically adapted to couple a personal computer and a peripheral.

20. A method of transmitting coded data signals over a bus having a limited bandwidth comprising:
transmitting a first edge of a data pulse; transmitting a second edge of the data pulse; the time period between the transmitted first edge and the transmitted second edge approximating one of a first set of different predetermined time periods; selected different predetermined time period of said set of different predetermined time periods respectively corresponding to unique pluralities of binary digital signals, wherein the data pulse is synchronized by a clock signal also transmitted over said bus.

21. The method of claim 20, wherein the bus comprises a bus coupling at least two devices in a personal computer system.

22. The method of claim 20, wherein at least some of the different predetermined time periods in the set of different predetermined time periods comprise a multiple of a short time period, a frequency corresponding to the short time period exceeding the bandwidth of the bus.

23. A system comprising:
a first device; a second device; and a bandlimited bus coupling the first device with the second device; at least one of said devices including the capability to at least code or decode data signals in order to transmit the at least coded or decoded data signals across said bandlimited bus; said at least one device including the capability to at least code or decode said data signals so that selected different durations between pairs of successive data signal edges respectively correspond to unique pluralities of binary digital signals, wherein the at least coded or decoded data signals are synchronized by clock signals also transmitted over said bandlimited bus.

24. The system of claim 23, wherein said at least one device includes a high-speed clock to measure short time periods for the at least coded or decoded data signals;
at least some of the selected different durations being a multiple of the short time period.

25. The system of claim 24, wherein said bandlimited bus comprises a bus coupling at least two devices in a personal computer system.

26. A device comprising:
digital electronic circuitry; said device being adapted to be coupled to a limited bandwidth bus; said digital electronic circuitry including the capability to at least code or decode data signals in order to transmit the at least coded or decoded data signals across said bandlimited bus so that selected different durations between pairs of successive data signal edges respectively correspond to unique pluralities of binary digital signals, wherein the at least coded or decoded data signals are synchronized by clock signals also transmitted over said bandlimited bus.

27. The device of claim 26, wherein said device includes a high-speed clock to measure short time periods for the at least coded or decoded data signals;
at least some of the selected different durations being a multiple of the short time period.

28. A method of transmitting decoded data signals over a bus having a limited bandwidth comprising:
receiving a first edge of a data pulse; receiving a second edge of the data pulse; the time period between the received first edge and the received second edge approximating one of a first set of different predetermined time periods; selected different predetermined time period of said set of different predetermined time periods respectively corresponding to unique pluralities of binary digital signals, wherein the data pulse is synchronized by a clock signal also received over said bus.

29. The method of claim 28, wherein the bus comprises a bus coupling at least two devices in a personal computer system.

30. The method of claim 28, wherein at least some of the different predetermined time periods in the set of different predetermined time periods comprise a multiple of a short time period, a frequency corresponding to the short time period exceeding the bandwidth of the bus.

* * * * *